(12) United States Patent
Spieth et al.

(10) Patent No.: US 9,416,537 B2
(45) Date of Patent: Aug. 16, 2016

(54) THREE-DIMENSIONAL STRUCTURE

(71) Applicant: Delignum S.a.r.l., Goedange (LU)

(72) Inventors: Werner Spieth, Buchenbach (DE); Nikolaus Faller, Freiburg (DE)

(73) Assignee: Delignum S.à.r.l., Goedange (LU)

( * ) Notice: Subject to any disclaimer, the term of this patent is extended or adjusted under 35 U.S.C. 154(b) by 29 days.

(21) Appl. No.: 14/508,192

(22) Filed: Oct. 7, 2014

(65) Prior Publication Data
US 2015/0099083 A1 Apr. 9, 2015

(30) Foreign Application Priority Data
Oct. 7, 2013 (DE) .......................... 10 2013 016 518

(51) Int. Cl.
*E04B 2/74* (2006.01)
*E04C 2/30* (2006.01)
*E04C 2/00* (2006.01)
*E04B 1/61* (2006.01)
*E04B 1/02* (2006.01)
*F16B 5/00* (2006.01)

(52) U.S. Cl.
CPC ................. *E04C 2/30* (2013.01); *E04B 1/6116* (2013.01); *E04B 2/7401* (2013.01); *E04B 1/02* (2013.01); *E04B 1/6162* (2013.01); *E04C 2002/001* (2013.01); *F16B 5/0092* (2013.01); *Y10T 428/17* (2015.01)

(58) Field of Classification Search
CPC .......................... Y10T 428/192; E04B 2/7425
USPC ............................................................ 428/58
See application file for complete search history.

(56) References Cited

U.S. PATENT DOCUMENTS 4,299,067 A * 11/1981 Bertschi ................ E04B 1/6162
403/296
5,211,502 A * 5/1993 Upham-Hill .......... E04B 2/7425
160/229.1

FOREIGN PATENT DOCUMENTS

| CA | 2790241 | | 8/2010 |
|---|---|---|---|
| DE | 9401386 | * | 3/1994 |
| WO | WO2010094432 | | 8/2010 |

* cited by examiner

*Primary Examiner* — Alexander Thomas
(74) *Attorney, Agent, or Firm* — Volpe and Koenig, P.C.

(57) ABSTRACT

A three-dimensional structure (1), which is made substantially of panel-shaped material blanks (3, 4, 5) is provided wherein adjacent material blanks are or can be each connected to one another by mutually opposing sides. At least two material blanks (3, 4, 5) which adjoin one another by opposing narrow sides can be detachably connected to one another without glue by at least one connection fitment (6) which (6) holds together the mutually adjoining narrow sides of the material blanks (3, 4, 5) by at least one screw connection.

10 Claims, 2 Drawing Sheets

THREE-DIMENSIONAL STRUCTURE

INCORPORATION BY REFERENCE

The following documents are incorporated herein by reference as if fully set forth: German Patent Application No. 102013016518.0, filed Oct. 7, 2013.

BACKGROUND

The invention relates to a three-dimensional structure which is made substantially from panel-shaped material blanks, wherein adjacent material blanks are or can be each connected to one another by mutually opposing sides.

From EP 2 398 972 B1 a method is already known which is intended to produce a three-dimensional structure of the type mentioned at the beginning, wherein this structure is made substantially from panel-shaped material blanks which are cut in sections from at least one material web and are then connected to one another in the form of the structure. The method of manufacture which is already known provides that the structure is divided in a first calculation or mental step into panel sections, wherein by way of example each wall or roof surface lying in one section can form one panel section. The individual panel sections are then in a following mental or calculation step each segmented into panel section parts orientated in the longitudinal or transverse direction of the panel section in order to then place the partition lines of the panel section parts into the connection zone. In a following calculation or mental step the panel section parts of at least one panel section which are to be made from the same structural or work material are placed on a material web which is then cut correspondingly into the panel section parts. The panel section parts of one panel section singled out in this way from the at least one material web can then be connected to one another to form the panel section in order in a following work step to connect the panel sections in the three-dimensional structure at the desired installation site. By the method of manufacture already known it is possible to set up quickly and with low expense a structure which is intended by way of example as a residential or office building, wherein this structure can be intended both for permanent and also for temporary use.

SUMMARY

In order additionally to accelerate and simplify the erection of a three-dimensional structure of this kind, the objective lies in particular in providing a structure of the type mentioned at the beginning in which the connection of the panel section parts of one panel section can be simplified and/or accelerated and can also where applicable be carried out quickly and simply at the installation site.

The solution according to the invention to meeting this objective provides in the case of a three-dimensional structure of the type mentioned at the beginning in particular that at least two material blanks which adjoin one another along their opposing narrow sides can be detachably connected to one another without glue by at least one connection fitment which holds together the mutually adjoining narrow sides of the material blanks by at least one screw connection.

The three-dimensional structure according to the invention is made substantially from panel-shaped material blanks which can be connected to one another into one panel section, which panel sections then each form a wall or roof surface of the structure. At least two material blanks which adjoin one another along opposing narrow sides are connected to one another without glue by at least one connection fitment, which at least one connection fitment holds the mutually adjoining narrow sides of the wall sections detachably together without glue by at least one screw connection. The at least one screw connection provided on the mutually adjoining narrow sides of at least two material blanks enables the quick and easy connection of these material blanks where applicable even at the installation site. Since at least two adjoining material blanks can also be connected at the installation site into the panel section forming a wall or roof surface of the structure according to the invention, the building can also be sized with comparatively large dimensions, because the material blanks forming one panel section are also to be transported to the installation site separately from one another. Since the screw connection of the at least one connection fitment guarantees a connection of the material blanks which can also be released again where required, the structure according to the invention can also be dismantled again when necessary in order to be set up again at another site.

A preferred embodiment according to the invention thereby proposes that at least one aperture is provided on the flat side in each of the mutually adjacent material blanks each at a distance from the narrow side intended for contact. An anchor element can be inserted into each aperture. Each connection fitment has at least one threaded rod or a threaded shaft which braces against one another the mutually associated anchor elements of a connection fitment in the apertures of adjacent material blanks. The at least one threaded rod or threaded shaft of each one connection fitment thereby passes through mutually aligned through openings in the material blanks as well as in at least one of the anchor elements. Since the at least one threaded rod or threaded shaft passes through the mutually aligned through openings in the material blanks, the accurately aligned position of the adjacent material blanks in the region of their mutually adjoining narrow sides is ensured.

A preferred embodiment according to the invention provides that the at least one threaded rod or threaded shaft of the at least one connection fitment projects with at least one free shaft or rod end above the thread opening of at least one anchor element and that a clamping nut which is arranged so that it can engage rotationally in the opening can be or is screwed onto this at least one free shaft or rod end. By turning the clamping nut which is screwed onto the free shaft or rod end, the anchor elements of the adjacent material blanks which are connected to one another by the threaded rod or threaded shaft can be braced against one another.

It is possible that the threaded rod or threaded shaft of the at least one connection fitment projects by its two free shaft or rod ends over the anchor elements which are arranged on both sides. An embodiment according to the invention which is particularly easy to handle proposes however that the threaded rod or threaded shaft is held secured against rotation on the adjoining anchor element by its end region which faces away from the free shaft or rod end. The threaded rod or threaded shaft is thus itself secured in a rotationally secured position when the clamping nut which is screwed onto it is tightened up or released again.

In order to be able to work the fastening points required for the connection fitment easily into the material blanks, it is advantageous if the at least one aperture provided in each adjacent material blank has a circular or rectangular opening cross-section.

It is thereby advantageous if an anchor element, configured as a half-cylinder, can be inserted into each aperture having a circular opening cross-section.

On the other hand, in the case of an aperture which has a rectangular opening cross-section, a box-shaped anchor element can be used.

In order to be able to use the structure according to the invention advantageously as a residential or office building, and in order to configure the inside of this structure to be as wind-tight as possible, it is expedient if the joint arranged between the mutually adjoining narrow sides of at least two adjacent material blanks is sealed by at least one joint sealing strip.

In order to configure this joint so as to be reliably wind-tight it is advantageous if the joint which is arranged between the mutually adjoining narrow sides of at least two adjacent material blanks is sealed by at least two joint sealing strips and if the through openings provided in the material blanks open in the narrow side partial area which is arranged between the at least two joint sealing strips.

BRIEF DESCRIPTION OF THE DRAWINGS

Further developments according to the invention are apparent from the claims in conjunction with the drawing as well as the description of the figures. The invention will now be described below in further detail with reference to preferred embodiments.

In the figures.

DETAILED DESCRIPTION OF THE PREFERRED EMBODIMENTS

Figure 1:
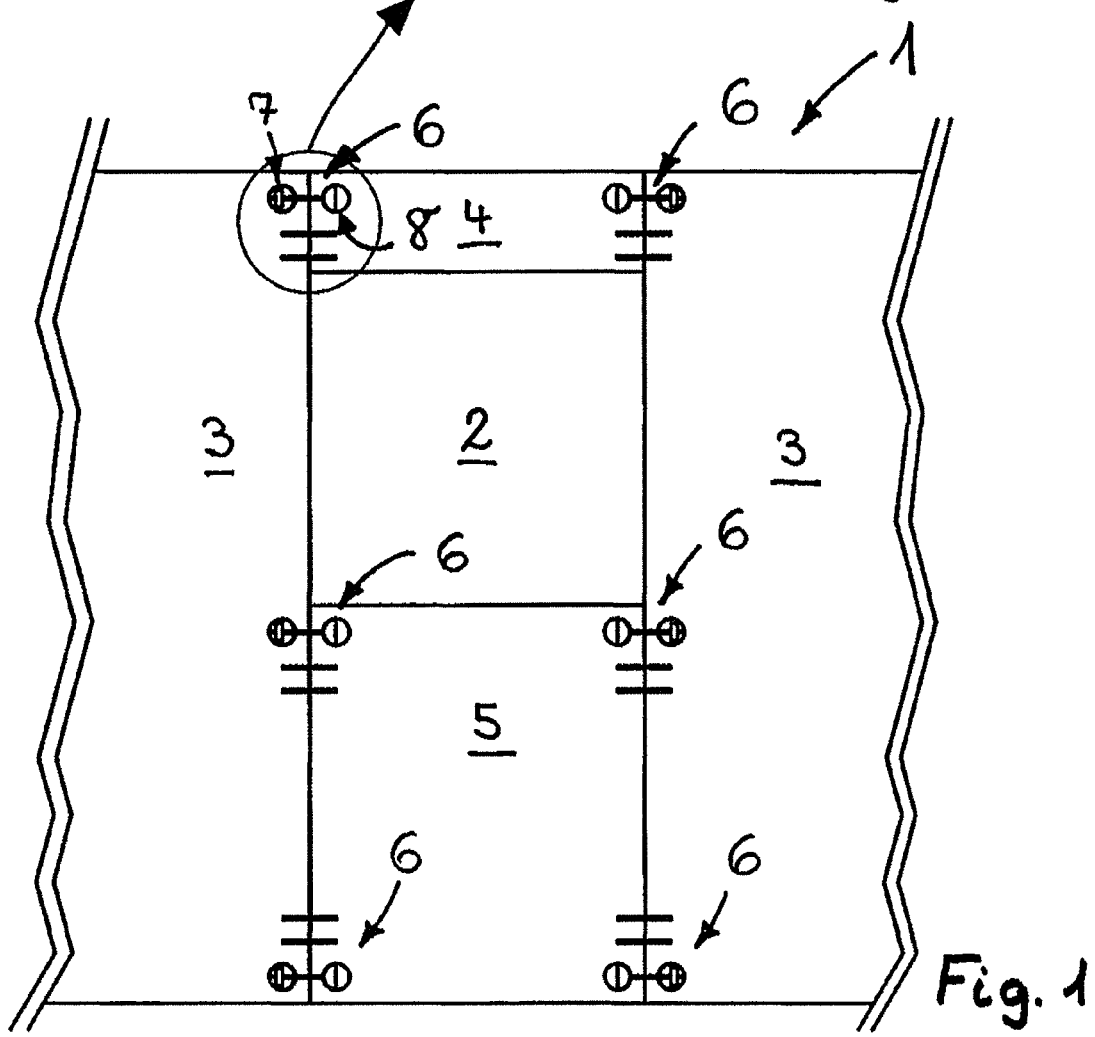
FIG. 1 is a three-dimensional structure in the region of a panel section forming a wall surface and having a window opening, which panel section is formed from a plurality of material blanks, wherein the blanks which adjoin one another with their opposing narrow sides are detachably connectable to one another by at least one connection fitment.

FIG. 1 shows a partial region of a panel section of a three-dimensional structure 1 not shown elsewhere in further detail. The panel section which here forms a wall surface with window opening 2 is made substantially of panel-shaped material blanks 3, 4 and 5 of which adjacent material blanks 3, 4, 5 are each connected to one another with mutually opposing narrow sides.

The opposing narrow sides of the material blanks 3, 4, 5 which adjoin one another in pairs are thereby detachably connected to one another without glue by at least one connection fitment 6 which holds together the mutually adjoining narrow sides of the material blanks 3, 4, 5 each by at least one screw connection. The at least one screw connection provided on the mutually adjoining narrow sides of at least two material blanks 3, 4, 5 enables the quick and easy connection of these material blanks 3, 4, 5 of the structure 1 where applicable even at the installation site. Since at least two adjacent material blanks 3, 4, 5 can be connected even at the installation site into the panel section which forms a wall or roof surface of the structure 1, the building can also be sized with comparatively large dimensions because the material blanks 3, 4, 5 which form one panel section can also be transported separately from one another to the installation site. Since the screw connection of the at least one connection fitment 6 ensures a connection of the material blanks 3, 4, 5 which can also be released when necessary, the structure 1 illustrated here can also be dismantled again when required in order to be erected anew at a different site.

Figure 2:
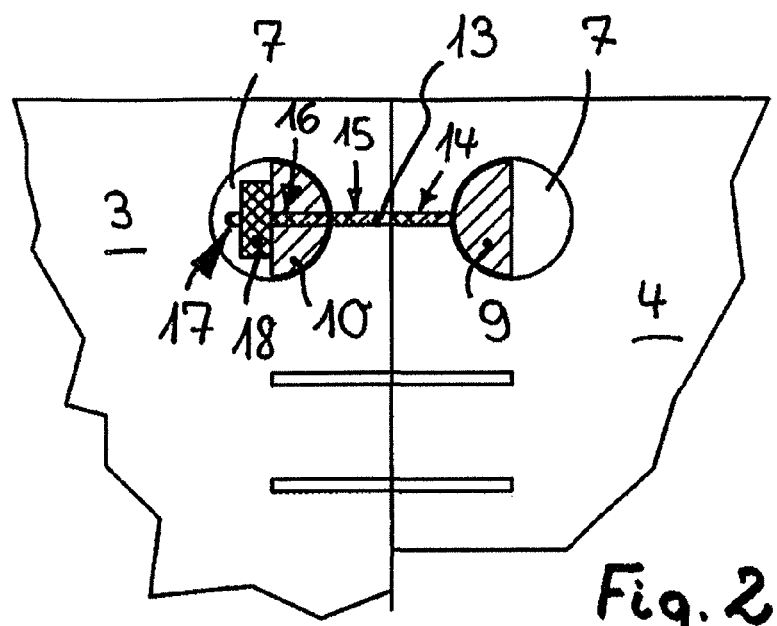
FIG. 2 shows the structure of FIG. 1 in the partial area of a panel section having a connection fitment.
Figure 3:
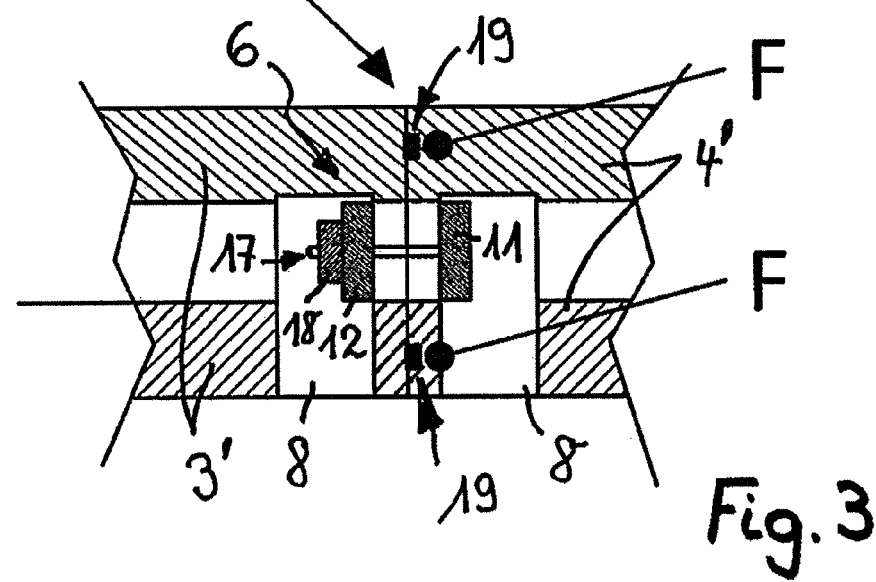
FIG. 3 shows two material blanks, shown in cross-sectional view, of a structure in the region of a connection fitment configured comparable with FIGS. 1 and 2, wherein it can be seen that the joint formed between two mutually adjoining material blanks is sealed by two joint sealing strips.

It can also be seen from FIGS. 1 to 3 that at least one aperture 7, 8 is provided on the flat side in each adjacent material blank 3, 4, 5 each at a distance from the narrow side intended for connection. At least one anchor element 9, 10 and 11, 12 can be inserted in each aperture 7, 8. Each screw connection of a connection fitment 6 is assigned a threaded rod 13 which braces the mutually associated anchor elements 9, 10 and 11, 12 respectively of a connection fitment 6 in the apertures 7, 8 of adjacent material blanks, and which passes through the mutually aligned through openings 14, 15 and 16 in the material blanks as well as in at least one of the anchor elements.

It can be seen in FIGS. 1 to 3 that the at least one threaded rod 13 of each connection fitment 6 projects by a free rod end 17 over the through opening 16 of the corresponding anchor element 10, 12 and that a clamping nut 18 which is arranged to rotationally engage in aperture 7 or 8 is screwed onto this at least one free rod end 17.

The threaded rod 13 is held secured against rotation at its end region facing away from the free rod end 17, on the adjacent anchor element 9, 11. The threaded rod 13 can thereby be turned tightly into a threaded blind hole in the anchor element 9, 11 or can be glued, welded, soldered or fixedly connected in another way with the anchor element 9, 11.

Whereas the apertures 7 provided in the material blanks 3, 4, 5 of the structure 1 illustrated in FIGS. 1 and 2 have a circular opening cross-section, the apertures 8 worked into the material blanks 3', 4' according to FIG. 3 have a rectangular cross-section. It can be seen in FIGS. 1 and 2 that an anchor element 9, 10 configured as a semi-cylinder can be inserted in each aperture 7 having a circular opening cross-section. On the other hand a box-shaped anchor element 11, 12 can be inserted in each aperture 8 having a rectangular opening cross-section.

Figure 4:
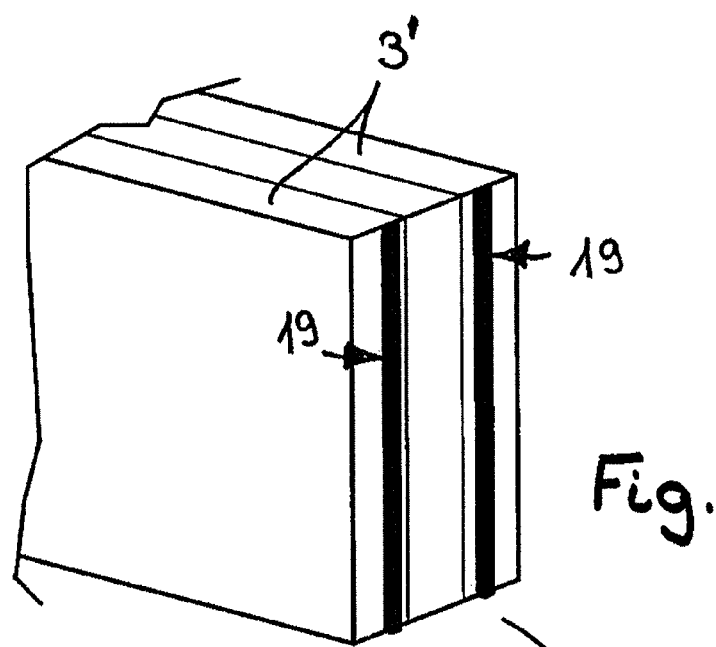
FIG. 4 shows one of the material blanks shown in FIG. 3 in the region of its narrow side supporting the two joint sealing strips.

In FIGS. 3 and 4 it is shown that the joint which is arranged between the mutually adjoining narrow sides of at least two adjacent material blanks 3', 4' is sealed by at least one joint sealing strip 19. From a comparison of FIGS. 3 and 4 it is clear that the join, which is arranged between the adjacent material blanks 3', 4', is here sealed by at least two joint sealing strips 19 wherein the through openings 14 provided in the material blanks 3', 4' open in the narrow side partial region arranged between the at least two joint sealing strips 19.

The invention claimed is:

1. A three-dimensional structure (1) comprising panel-shaped material blanks (3, 4, 5), adjacent ones of the material blanks are connected to one another each by mutually opposing narrow sides thereof, wherein at least two of the material blanks (3, 4, 5) which adjoin one another by the opposing narrow sides are detachably connected to one another with a glueless connection including at least one connection fitment (6) that holds together the mutually adjoining narrow sides of the material blanks (3, 4, 5) by at least one screw connection, at least one aperture (7, 8) having a circular opening cross-section located on a flat side in each adjacent one of the material blanks (3, 4, 5) at a distance from the narrow side to be connected, at least one anchor element (9, 10; 11, 12) that is inserted in each one of the apertures (7, 8), the anchor elements being configured as half-cylinders, and at least one threaded rod (13) or threaded shaft (13) that braces mutually associated ones of the anchor elements (9, 10; 11, 12) of adjacent ones of the material blanks (3, 4, 5; 3', 4') against one another and which passes through mutually aligned through openings (14, 15, 16) in the material blanks (3, 4, 5; 3', 4') as well as in at least one of the anchor elements (10, 12).

2. The structure as claimed in claim 1, wherein the at least one threaded rod (13) or threaded shaft of the at least one connection fitment (6) projects with at least one free shaft or rod end (17) beyond the through opening (16) of the at least one anchor element (10, 12) and a clamping nut (18) which is arranged for rotational engagement in the aperture is screwed onto the at least one free shaft or rod end (17).

3. The structure as claimed in claim 2, wherein the at least one threaded rod (13) or threaded shaft is held secured against rotation on the adjacent anchor element (9, 11) by an end region thereof which faces away from the free shaft or rod end (17).

4. The structure as claimed in claim 1, wherein a joint which is arranged between the mutually adjoining narrow sides of at least two adjacent ones of the material blanks (3', 4') is sealed by at least one joint sealing strip (19).

5. The structure as claimed in claim 4, wherein the joint which is arranged between the mutually adjoining narrow sides of at least two adjacent ones of the material blanks (3', 4') is sealed by at least two of the joint sealing strips (19) and through openings (14) that are provided in the material blanks (3', 4') open in a narrow side partial region arranged between the at least two joint sealing strips (19).

6. A three-dimensional structure (1) comprising panel-shaped material blanks (3, 4, 5), adjacent ones of the material blanks are connected to one another each by mutually opposing narrow sides thereof, wherein at least two of the material blanks (3, 4, 5) which adjoin one another by the opposing narrow sides are detachably connected to one another with a glueless connection including at least one connection fitment (6) that holds together the mutually adjoining narrow sides of the material blanks (3, 4, 5) by at least one screw connection, at least one aperture (7, 8) having a rectangular opening cross-section located on a flat side in each adjacent one of the material blanks (3, 4, 5) at a distance from the narrow side to be connected, at least one anchor element (9, 10; 11, 12) that is inserted in each one of the apertures (7, 8), and at least one threaded rod (13) or threaded shaft (13) that braces mutually associated ones of the anchor elements (9, 10; 11, 12) of adjacent ones of the material blanks (3, 4, 5; 3', 4') against one another and which passes through mutually aligned through openings (14, 15, 16) in the material blanks (3, 4, 5; 3', 4') as well as in at least one of the anchor elements (10, 12), and the anchor elements are configured as box-shaped anchor elements (11, 12) that are inserted in each of the apertures (8) having said rectangular opening cross-sections.

7. The structure as claimed in claim 6, wherein the at least one threaded rod (13) or threaded shaft of the at least one connection fitment (6) projects with at least one free shaft or rod end (17) beyond the through opening (16) of the at least one anchor element (10, 12) and a clamping nut (18) which is arranged for rotational engagement in the aperture is screwed onto the at least one free shaft or rod end (17).

8. The structure as claimed in claim 7, wherein the at least one threaded rod (13) or threaded shaft is held secured against rotation on the adjacent anchor element (9, 11) by an end region thereof which faces away from the free shaft or rod end (17).

9. The structure as claimed in claim 6, wherein a joint which is arranged between the mutually adjoining narrow sides of at least two adjacent ones of the material blanks (3', 4') is sealed by at least one joint sealing strip (19).

10. The structure as claimed in claim 9, wherein the joint which is arranged between the mutually adjoining narrow sides of at least two adjacent ones of the material blanks (3', 4') is sealed by at least two of the joint sealing strips (19) and through openings (14) that are provided in the material blanks (3', 4') open in a narrow side partial region arranged between the at least two joint sealing strips (19).

\* \* \* \* \*